United States Patent
Raghu et al.

(10) Patent No.: US 9,042,487 B2
(45) Date of Patent: May 26, 2015

(54) BLIND I/Q MISMATCH COMPENSATION WITH RECEIVER NON-LINEARITY

(75) Inventors: Ganesan Raghu, Bangalore (IN); Bijoy Bhukania, Bangalore (IN); Jaiganesh Balakrishnan, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 13/584,804

(22) Filed: Aug. 13, 2012

(65) Prior Publication Data
US 2014/0044158 A1    Feb. 13, 2014

(51) Int. Cl.
  H03D 3/00    (2006.01)
  H03K 9/06    (2006.01)
  H04L 27/38   (2006.01)
  H04B 1/00    (2006.01)

(52) U.S. Cl.
  CPC .......... H04L 27/3863 (2013.01); H04B 1/0039 (2013.01)

(58) Field of Classification Search
  CPC .......................... H04B 1/30; H03D 2200/0047
  USPC .................. 375/322, 296, 260, 346; 455/302, 455/114.3, 341, 239.1; 330/291, 75
  See application file for complete search history.

(56) References Cited

U.S. PATENT DOCUMENTS

| | | | |
|---|---|---|---|
| 7,280,619 B2 | 10/2007 | Nemer et al. | |
| 2002/0041208 A1 | 4/2002 | Hamada et al. | |
| 2003/0104792 A1 | 6/2003 | Doi | |
| 2005/0152463 A1 | 7/2005 | DeChamps et al. | |
| 2007/0206703 A1* | 9/2007 | Corredoura | 375/296 |
| 2007/0232250 A1 | 10/2007 | Sun et al. | |
| 2009/0221255 A1* | 9/2009 | Ma et al. | 455/305 |
| 2011/0221524 A1* | 9/2011 | Matsubara et al. | 330/149 |
| 2012/0028594 A1* | 2/2012 | Rao et al. | 455/207 |

OTHER PUBLICATIONS

Blind I/Q Imbalance Parameter Estimation and Compensation in Low-IF Receivers; Marcus Windisch, Gerhard Fettweis; IEEE First International Symposium on Control, Communications and Signal Processing, Mar. 21-24, 2004, Hammamet, Tunisia; pp. 75-78; ISBN: 0-7803-8379-6.

\* cited by examiner

Primary Examiner — Sam K Ahn
Assistant Examiner — Fabricio R Murillo Garcia
(74) Attorney, Agent, or Firm — Lawrence J. Bassuk; Frank D. Cimino

(57) ABSTRACT

Apparatus and methods disclosed herein perform gain, clipping, and phase compensation in the presence of I/Q mismatch in quadrature RF receivers. Gain and phase mismatch are exacerbated by differences in clipping between I & Q signals in low resolution ADCs. Signals in the stronger channel arm are clipped differentially more than weaker signals in the other channel arm. Embodiments herein perform clipping operations during iterations of gain mismatch calculations in order to balance clipping between the I and Q channel arms. Gain compensation coefficients are iteratively converged, clipping levels are established, and data flowing through the network is gain and clipping compensated. A compensation phase angle and phase compensation coefficients are then determined from gain and clipping compensated sample data. The resulting phase compensation coefficients are applied to the gain and clipping corrected receiver data to yield a gain, clipping, and phase compensated data stream.

12 Claims, 9 Drawing Sheets

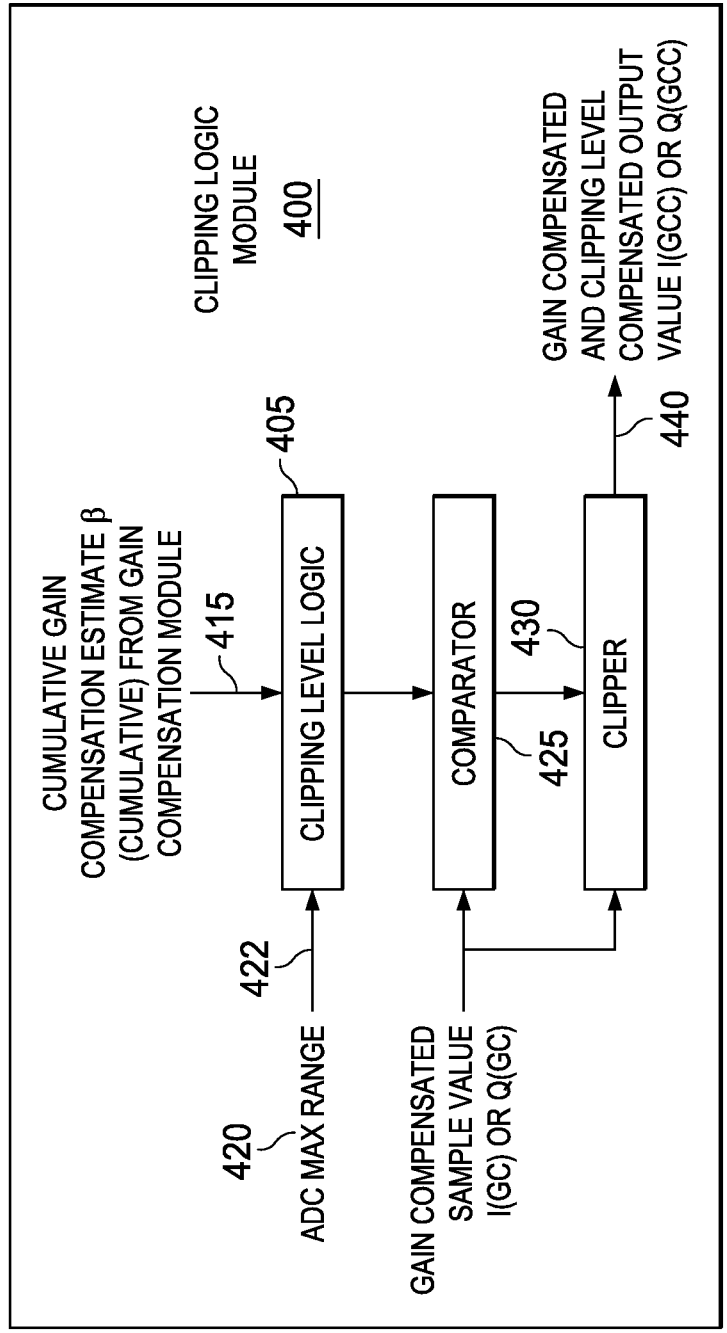

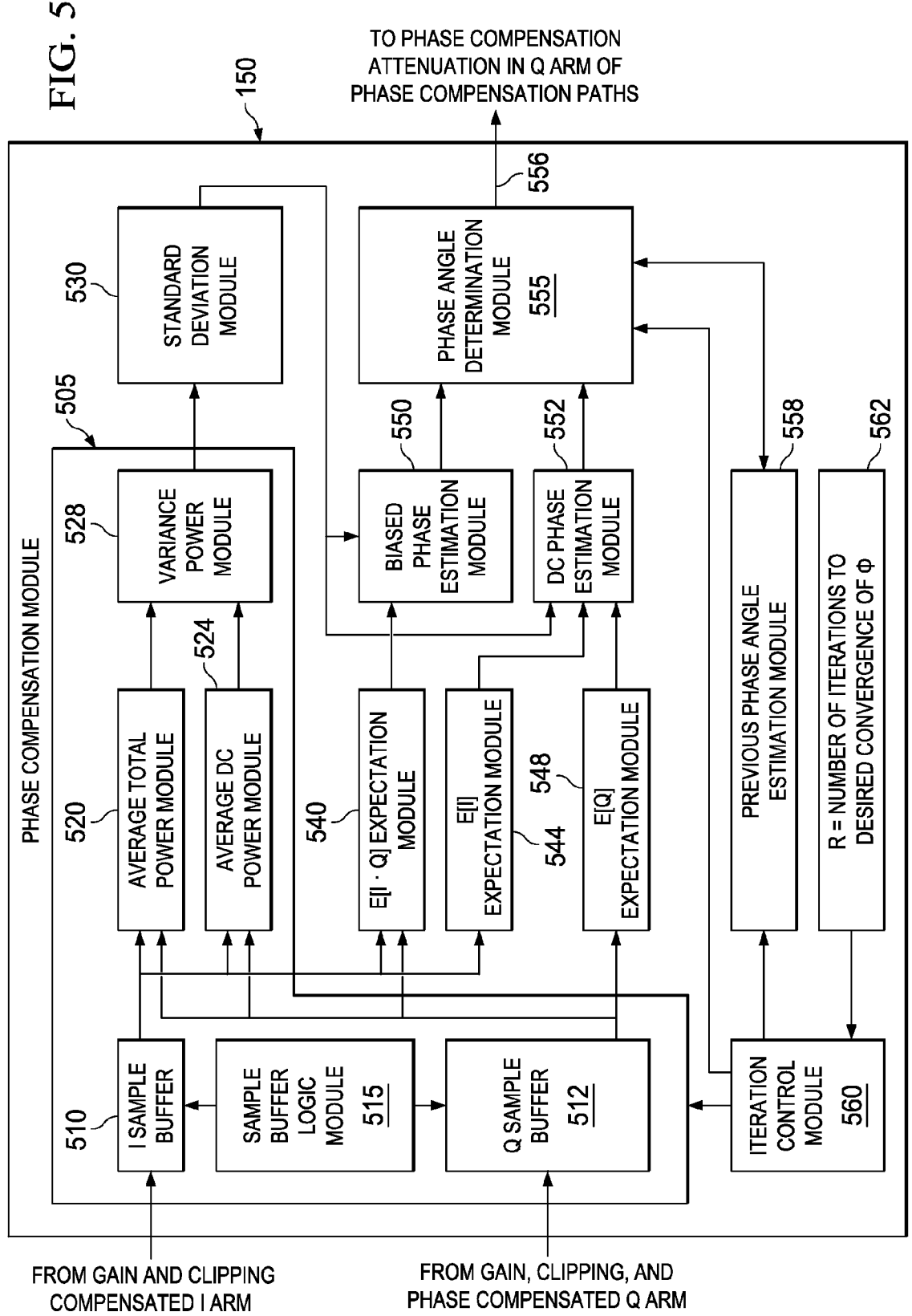

BLIND I/Q MISMATCH COMPENSATION WITH RECEIVER NON-LINEARITY

TECHNICAL FIELD

Embodiments described herein relate to apparatus and methods associated with electronic circuits, including RF receiver gain and phase mismatch compensation processing.

BACKGROUND INFORMATION

Quadrature radio frequency (RF) signal transmission and reception exploits the concept that a single carrier wave may carry two independent data streams, provided that the data streams modulate the carrier in quadrature. For example, one of the data streams may modulate the carrier as a sine function and the other data stream may modulate the carrier as a cosine function. In any case, the two modulation streams must have a phase offset of 90° with respect to each other. The quadrature data streams are typically referred to as I data and Q data, representing an in-phase data stream and a data stream that is in quadrature with the in-phase data stream, that is, at a phase angle of 90° thereto.

A quadrature RF receiver splits the received signal into two paths, referred to herein as an "I arm" and a "Q arm." The I signal is down-converted by mixing the received signal with an I-arm local oscillator (LO) carrier signal. The Q signal is likewise down-converted by mixing the received signal with a Q-arm LO carrier. Ideally, the Q-arm LO signal is of precisely the same magnitude as the I-arm LO signal and is exactly 90° out of phase with the I-arm LO signal. In actual practice, the I and Q arm LO signals often vary somewhat in magnitude and drift in phase away from perfect quadrature, creating a problem referred to as I/Q mismatch. Other factors such as non-ideal low-pass filter characteristics may also contribute to I/Q mismatch.

I/Q mismatch results in extraneous LO energy components in the image spectrum and the subsequent down-conversion of image spectrum interference. Said differently, I/Q mismatch results in decreased image rejection performance and lower SNRs.

In the presence of gain and phase mismatch, I and Q LO carriers may be mathematically modeled as:

$$C_I(t) = \cos(\omega t + \theta); C_Q(t) = -\beta \sin(\omega t + \theta + \Phi)$$

where $\Phi$ represents phase mismatch between the two LO carriers and where $\beta$ represents gain mismatch between the two LO carriers.

The resulting received, down-converted I and Q signals may be represented as:

$$I_R(t) = I(t)$$

$$Q_R(t) = \beta(Q(t)\cos\Phi - I(t)\sin\Phi)$$

It is noted that the I and Q signals are not independent in the presence of I/Q mismatch as they are when in ideal quadrature with each other. Rather, the Q signal now includes an I signal component.

The gain imbalance $\beta$ is estimated as:

$$\beta = \sqrt{\frac{\text{variance}(Q_R^2)}{\text{variance}(I_R^2)}} = \sqrt{\frac{\sigma_{Q_R}^2}{\sigma_{I_R}^2}}$$

The phase imbalance $\Phi$ is estimated as:

$$\phi = \sin^{-1}\left(\frac{E[I_R \cdot Q_R] - E[I_R] \cdot E[Q_R]}{\sigma_{I_R}\sigma_{Q_R}}\right)$$

BRIEF DESCRIPTION OF THE DRAWINGS

FIG. 4 is a block diagram of a clipping logic module in a gain and phase compensation network according to various example embodiments.

FIG. 5 is a block diagram of a phase compensation module in a gain and phase compensation network according to various example embodiments.

SUMMARY OF THE INVENTION

Figure 1:
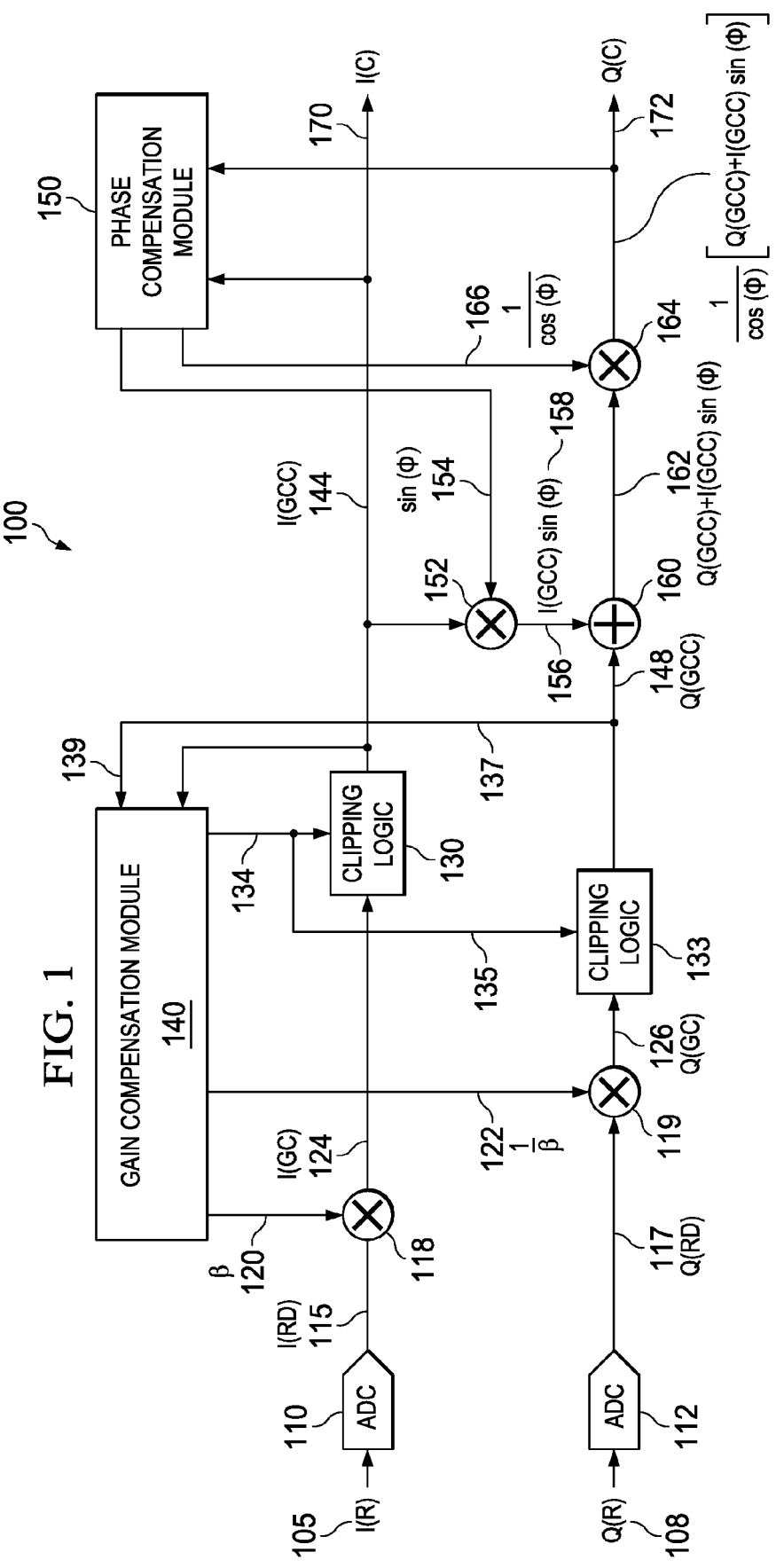
FIG. 1 is a diagram of a gain and phase compensation network according to various example embodiments of the invention.

Embodiments and methods herein perform gain and phase imbalance compensation in an RF quadrature receiver in the presence of non-linearities. Such non-linearities may be introduced in analog and/or digital sections of a quadrature receiver. As an example used hereinunder, one such non-linearity may result from signal clipping in an analog-to-digital converter (ADC) used to digitally sample I and Q signals for further upstream digital processing. Some embodiments determine a clipping threshold associated with data samples in the I arm, the Q arm, or both. The clipping threshold is then applied to received and converted data in the I arm and/or the Q arm such as to balance a statistical distribution between data in the two arms.

Some embodiments and methods herein perform gain and phase imbalance compensation in an RF quadrature receiver in the presence of analog-to-digital (ADC) clipping artifacts. Q-arm/I-arm gain imbalance manifests itself as a difference in average AC signal power between I and Q signals as presented at the inputs of their respective ADCs. For purposes of convention in this disclosure, a positive gain imbalance shall mean that the average AC signal power in the Q arm is greater than the average AC signal power in the I arm. Likewise a stronger average AC signal power in the I arm shall be referred to herein as a negative gain imbalance. The higher-power arm, whether I-arm or Q-arm, shall be referred to as being "dominant."

Data sample values at the output of an ADC should faithfully represent the gain imbalance in the analog signal at the ADC input at sampling time, assuming ADC clipping levels greater than peak signal levels. Conversely, an ADC with insufficient dynamic range will exacerbate the I/Q mismatch problem by disproportionately clipping whichever quadrature arm is dominant with respect to gain imbalance. Such difference in clipping complicates the task of gain and phase imbalance compensation. Gain imbalance as calculated from I and Q data sample averages is underestimated in the presence of clipping. The underestimation occurs because proportionally more signal power is lost through clipping from the dominant arm than from the lower-power arm. Clipping also biases phase imbalance estimates as a consequence of poor I/Q statistical correlation at time instances when I, Q, or both are clipped.

ADC hardware with sufficient dynamic range to prevent clipping in a high dynamic range signal environment may be too expensive to match the design goals for a particular receiver type. Embodiments herein include clipping functions in the I and Q arms. The clipping functions perform additional clipping operations on data values in the non-dominant arm in order to balance clipping artifacts between the two arms. Balanced clipping and the balancing of other non-linearities in the I arm and Q arm contribute to matching statistical data distribution functions in the I and Q arms. Aligned data distribution functions associated with the receiver arms contribute to accurate gain & phase imbalance estimates. These embodiments and methods enable the use of lower-cost ADCs with correspondingly lower dynamic range. They may be particularly useful in RF receivers designed to process signals of high Peak-to-Average ratio (PAR) such as WLAN receivers and receivers processing highly Gaussian noise content such as GPS receivers.

Embodiments herein iteratively estimate and apply gain compensation. Clipping levels are re-balanced at the start of each gain compensation iteration as further described below. Following convergence of the gain and clipping functions after a preset number of iterations, gain and clipping-corrected I and Q signals appear at inputs to a phase compensation portion of the gain and phase compensation network. The phase compensation network operates on one or more sets of I and Q data appearing at the phase compensation network output. A phase angle mismatch estimate calculated from the latter data is used to compensate for phase mismatch by subtracting the appropriate I signal component from the time-correlated Q signal and by factoring the Q signal according to the amount of phase mismatch.

Thus, apparatus and methods herein perform gain, clipping, and phase compensation and balancing according to various temporal sequences. Sequencing between gain/compensation training and normal live-data receiver operation may proceed variously according to system design requirements. In some embodiments, a full set of training sequences may be performed at receiver power-on or reset, or at the occurrence of some appropriate triggering event. For example, training sequences may be initiated upon sensing receiver temperature or supply voltage changes or other operating parameter conditions that could modify receiver channel gain/phase characteristics. Some embodiments may perform full or partial training sequences continuously or at fixed intervals. Training sequence data may be discarded in some cases and/or passed on to subsequent stages during periods when the receiver is online and therefore expected to produce usable data at receiver outputs. Some embodiments herein may time-sample a live data stream for purposes of periodic or continuous gain and/or phase compensation in the presence of ADC-induced clipping.

Within certain constraints, embodiments herein may implement various schemes of sequencing between the functions of determining a gain compensation coefficient $\beta$ and applying functions of $\Phi$ to a gain and clipping compensated incoming data stream. In general, a selected or predetermined number of iterations of data capture and analysis yield a $\beta$ and a scaled clipping level that will have converged to acceptably accurate values. These methods are recursive in that sample data is captured at the output of the gain/clipping portion of the method or network. Thus, a data sample used in the calculation of a new-iteration $\beta$ value will itself have been factored by the previous-iteration $\beta$ value and will have been artificially clipped by the previous-iteration scaled clipping level. It is noted, however, that some sequences of I data or Q data may be factored and/or clipped by a unity gain value, as further described below. For example, sample data used in the first iteration of $\beta$ may be factored and clipped by a unity gain value, given that no value may yet exist for $\beta$.

According to these disclosed methods, gain compensation estimation uses clipping balancing at each iteration, as mentioned. The phase angle estimation and compensation scheme uses input data that has been gain and clipping compensated using the converged value of $\beta$. Consequently, embodiments herein determine and apply phase compensation during a sequence following gain/clipping training. Phase training yields the compensation phase angle $\Phi$. $\Phi$ is converged to an accuracy that is dependent upon the number of data samples used to calculate $\Phi$ but not dependent upon a number of iterations of calculations using different data sets. Thus, embodiments herein may perform phase training iteratively using multiple data sets or may perform a single calculation of $\Phi$ following the acquisition of a larger single data set. It is noted that some embodiments may perform clipping-compensated gain compensation in the absence of phase compensation. It is also noted that gain and/or phase compensation may be applied by the compensation network at any time in the future based upon previously-determined values of $\beta$ and $\Phi$.

The invented structures and methods provide for gain, clipping, and phase compensation in the presence of I/Q mismatch exacerbated by differential clipping in low resolution I and Q ADCs. Improved image rejection performance may enhance receiver operation.

DETAILED DESCRIPTION

FIG. 1 is a diagram of a gain and phase compensation network 100 according to various example embodiments of the invention. Down-converted and filtered analog signals I(R) 105 and Q(R) 108 are received at ADCs 110 and 112, respectively. The ADC's 110 and 112 convert the analog signals I(R) 105 and Q(R) 108 to digitally sampled data streams I(RD) 115 and Q(RD) 117, respectively.

The compensation network 100 includes an I-arm multiplier 118 and a Q-arm multiplier 119 communicatively coupled to the ADCs 110 and 112, respectively. The I-arm multiplier 118, the Q-arm multiplier 119, or both, factor one or more sets of received data samples from the I-arm data stream I(RD) 115 and/or the Q-arm data stream Q(RD) 117. I-arm data samples, if factored, are factored by a gain compensation coefficient $\beta$ appearing at a multiplier input 120. Q-arm data samples, if factored, are factored by a gain compensation coefficient $1/\beta$ appearing at a clipping logic module input 122. Gain-compensated sets of I data and Q data samples I(GC) 124 and Q(GC) 126 result.

The compensation network 100 also includes an I-arm clipping logic module 130 communicatively coupled to the multiplier 118 and a Q-arm clipping logic module 133 communicatively coupled to the multiplier 119. The clipping logic modules 130 and 133 perform clipping operations on the gain compensated set of I data samples I(GC) 124, the gain compensated set of Q data samples Q(GC) 126, or both. "Clipping operations," in the context of the instant disclosure, means factoring data values whose magnitude is greater than a specified clipping level. In some embodiments, affected data values may be factored down to the specified clipping level. However, this disclosure contemplates other clipper factoring schemes as may be applicable to various clipping imbalances introduced by various ADC technologies and other receiver non-linearities. Clipping level information appears at the inputs 134 and 135 of the clipping logic modules 130 and 133, respectively. Gain and clipping compensated I data samples I(GCC) and Q data samples Q(GCC) result at the outputs 144 and 148 of the clipping logic modules 130 and 133, respectively.

The compensation network 100 further includes a gain compensation module 140 communicatively coupled to the multipliers 118 and 119 and to the clipping logic modules 130 and 133. The gain compensation module 140 buffers samples I(GCC) and Q(GCC) at the start of each of a first set of iterations corresponding to the gain compensation function. The gain compensation module 140 processes the buffered data samples to determine an estimated gain compensation coefficient $\beta$, as further described below. The factor $\beta$ or $1/\beta$ is associated with the gain compensation functions performed by the multiplier 118 in the I arm, the multiplier 119 in the Q arm, or both. At the start of the first iteration, a value for $\beta$ will not yet be available. The gain compensation module 140 may thus process an uncompensated set of I(GCC) and Q(GCC) data to produce the first estimate of $\beta$.

The gain compensation module 140 also utilizes $\beta$ and known ADC characteristics to establish a clipping threshold to send to clipping logic modules 130 and 133. The clipping threshold is associated with a clipping compensation function performed by clipping logic modules 130 and 133 following frequency conversion and ADC conversion and as further described below.

The compensation network 100 also includes a phase compensation module 150 communicatively coupled to the clipping logic module outputs 144 and 148. The phase compensation module 150 is also communicatively coupled to the compensation network 100 outputs 170 and 172. From the latter outputs, the phase compensation module buffers a set of gain, clipping, and phase compensated I and Q data samples at the start of each of a second set of iterations. It is noted that the first set of iterations is associated with obtaining converged gain and clipping compensation coefficients, as described above.

The phase compensation module 150 calculates an estimated phase compensation angle $\Phi$ using the compensated data samples, as further described below. The phase compensation module 150 may directly estimate the phase imbalance compensation factor or may calculate trigonometric functions of $\Phi$ to be used as factors to perform further compensation operations on the Q arm. Specifically, the phase compensation module 150 provides the factor $\sin(\Phi)$ on control line 154 to the multiplier 152. The factor $I(GCC)*\sin(\Phi)$ represents the component of I that was subtracted from Q as a consequence of the original I/Q mismatch with clipping. The latter factor is summed back into Q(GCC) at the summing junction 160 in order to perform this portion of the compensation, resulting in the intermediate results $Q(GCC)+I(GCC)*\sin(\Phi)$ at node 162. Finally, this intermediate result is factored in multiplier 164 by $1/\cos(\Phi)$. The latter factor appears at input 166 from the phase compensation module 150. These operations compensate the Q-arm data to further conform I-arm and Q-arm data distribution functions.

Figure 2:
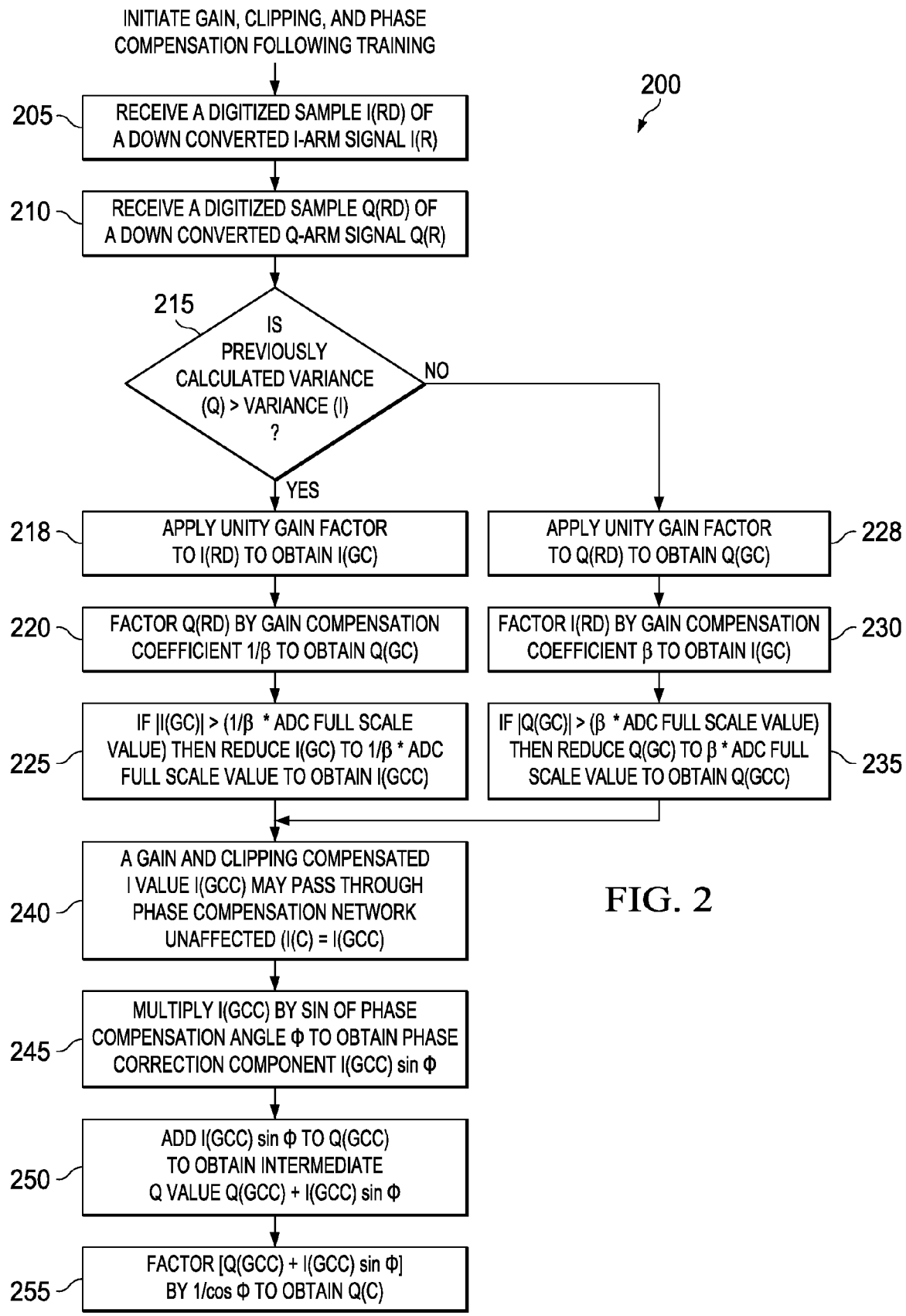
FIG. 2 is a flow diagram representing a method of performing gain and phase compensation in an RF quadrature receiver according to various example sequences.

FIG. 2 is a flow diagram representing a method 200 of performing gain and phase compensation in a trained RF quadrature receiver according to various example sequences. For purposes of this disclosure, "trained RF quadrature receiver" means that one or more iterations of gain, clipping, and/or phase compensation operations have been performed on sampled data to determine compensation coefficients and that the resulting compensation coefficients are currently applied in a compensation network such as the network 100 previously described.

The method 200 commences at blocks 205 and 210 with receiving a digitized sample of a down-converted I-arm signal and a digitized sample of a down-converted Q-arm signal (e.g., the digitized samples I(RD), Q(RD) of the down-converted signals I(R), Q(R), respectively, of FIG. 1).

The method 200 includes determining whether a previously calculated variance(Q) value is greater than a corresponding previously calculated variance(I) value, at block 215. If so, the method 200 includes factoring I(RD) by a unity gain factor to obtain I(GC), at block 218. The method 200 also includes factoring Q(RD) by a gain compensation coefficient $1/\beta$ to obtain a gain compensated value Q(GC), at block 220. In the case of variance(Q) greater than variance(I), the method 200 also includes performing clipping compensation by factoring certain but not all gain compensated I data values I(GC). For all $|I(GC)|$ greater than $1/\beta*(ADC\_full\_scale\_value)$, the method 200 includes reducing I(GC) to $1/\beta*(ADC\_full\_scale\_value)$ to obtain I(GCC), at block 225. It is noted that clipping compensation may find nothing to clip from Q(GC) data in this case, because Q(GC) data has already been gain compensated down to the clipping threshold or below. Thus, in the latter case, Q(GCC) is equal to Q(GC).

If a previously calculated ratio of variance(Q)/variance(I) is less than one, the method 200 includes factoring Q(RD) by a unity gain factor to obtain Q(GC), at block 228. The method 200 also includes factoring I(RD) by a gain compensation coefficient $\beta$ to obtain a gain compensated value I(GC), at block 230. To perform clipping balancing in the case of the previously calculated ratio of variance(Q)/variance(I) less than one, for all $|Q(GC)|$ greater than $\beta*(ADC\_full\_scale\_value)$, the method 200 includes reducing Q(GC) to $\beta*(ADC\_full\_scale\_value)$ to obtain Q(GCC), at block 235. It is noted that clipping compensation may find nothing to clip from I(GC) data in this case, because I(GC) data has already been gain compensated down to the clipping threshold or below. Thus, in the latter case, values of I(GCC) are equal to corresponding values of I(GC).

The method 200 continues at block 240 with noting that gain and clipping compensated I(GCC) values may pass through a phase compensation network (e.g. the phase compensation network of FIG. 1 at output 170) in an unaltered state. That is, again referring to FIG. 1, I(GCC) is equal to I(GC).

The method 200 includes factoring I(GCC) by $\sin(\Phi)$ to obtain a phase correction component $I(GCC)*\sin(\Phi)$, at block 245. The method 200 also includes adding $I(GCC)*\sin(\Phi)$ to Q(GCC) to obtain an intermediate Q value $Q(GCC)+I(GCC)*\sin(\Phi)$, at block 250. It is noted that Q(t) acquired a negative I(t) component during the process of being down-converted using non-ideal LOs. Here, the method 200 algebraically sums the $I(GCC)*\sin(\Phi)$ factor out of the Q data stream. The method 200 also includes factoring $[Q(GCC)+I(GCC)*\sin(\Phi)]$ by $1/\cos(\Phi)$ to obtain a phase compensated Q value Q(C), at block 255.

Figure 3:
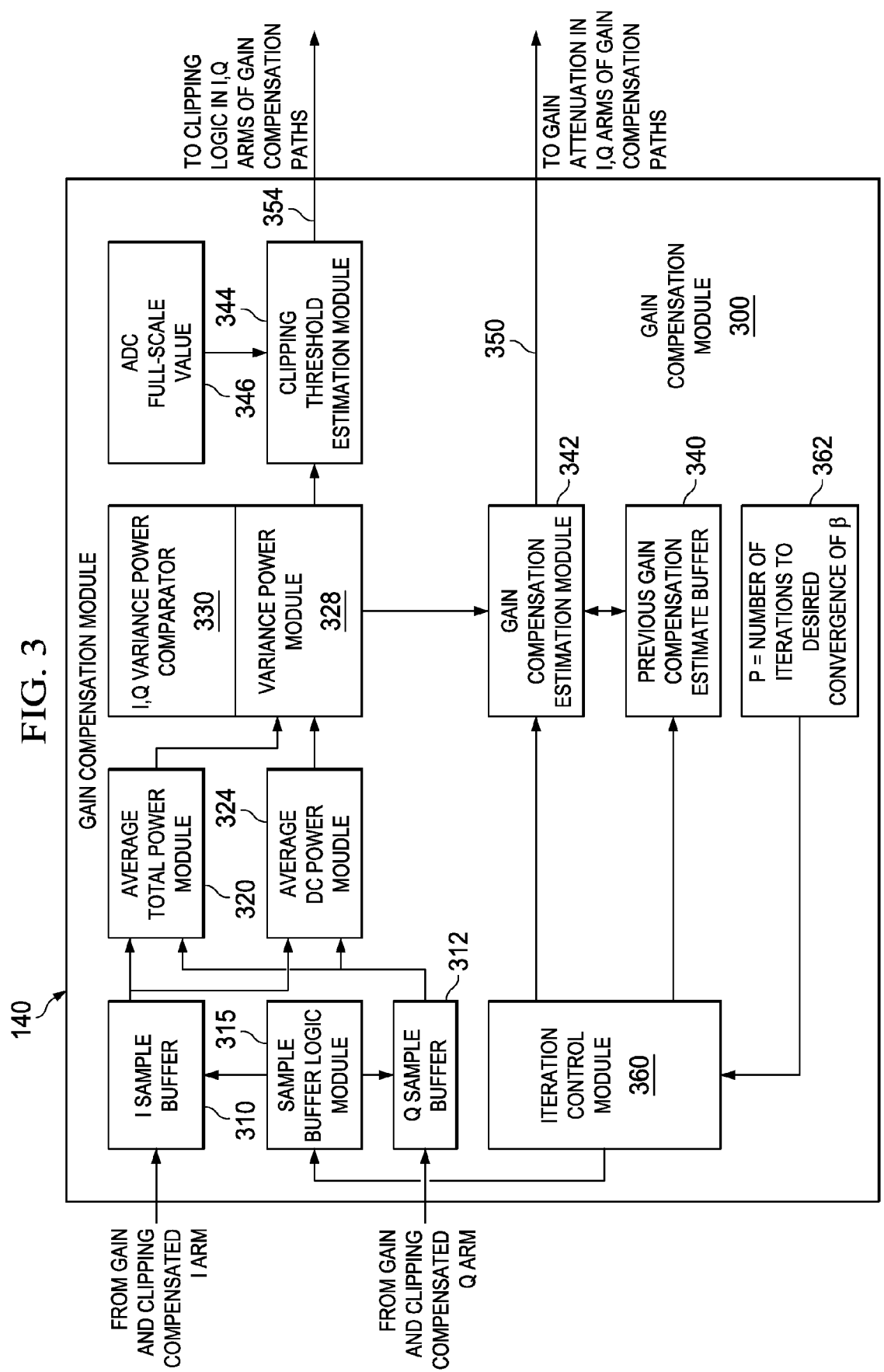
FIG. 3 is a block diagram of a gain compensation module in a gain and phase compensation network according to various example embodiments.

FIG. 3 is a block diagram of a gain compensation module 140 in a gain and phase compensation network according to various example embodiments. The gain compensation module 140 includes I and Q sample buffers 310 and 312 to accept gain and clipping compensated sets of I and Q data samples for processing. The gain compensation module 140 also includes a sample buffer logic module 315 communicatively coupled to the I and Q sample buffers 310 and 312. The sample buffer logic module 315 gates gain and clipping compensated sets of I and Q data samples into the I and Q sample buffers 310 and 312 at the start of a gain compensation iteration.

The gain compensation module 140 also includes an average total power module 320 communicatively coupled to the I and Q sample buffers 310 and 312. The average total power module 320 performs a first set of mathematical operations on the I and Q data samples as further described below. The first set of mathematical operations results in a value I(AVG_TOTAL) of average total power in the I arm and a value Q(AVG_TOTAL) of average total power in the Q arm.

The gain compensation module 140 further includes an average DC power module 324 communicatively coupled to the I and Q sample buffers 310 and 312. The average DC power module 324 performs a second set of mathematical operations on the I and Q data samples as further described below. The second set of mathematical operations results in a value I(AVG_DC) of average DC power in the I arm and a value Q(AVG_DC) of average DC power in the Q arm.

The gain compensation module 140 also includes a variance power module 328 communicatively coupled to the average total power module 320 and to the average DC power module 324. The variance power module 328 subtracts I(AVG_DC) from I(AVG_TOTAL) to obtain a variance(I) of average AC signal power in the I arm. The variance power module 328 also subtracts Q(AVG_DC) from Q(AVG_TOTAL) to obtain a variance(Q) of average AC signal power in the Q arm. The gain compensation module 140 also includes an I, Q variance power comparator 330 communicatively coupled to the variance power module 328. The I, Q variance power comparator 330 determines whether the I arm or the Q arm is gain-dominant. Gain dominance determines whether gain factoring or clipping balancing is applied to the I arm or Q arm.

The gain compensation module 140 also includes a previous gain compensation estimate buffer 340 communicatively coupled to the variance power module 328. The previous gain compensation estimate buffer 340 stores a cumulative gain compensation estimate β(PREV) calculated during previous iterations. The gain compensation module 140 further includes a gain compensation estimation module 342 communicatively coupled to the variance power module 328 and to the previous gain compensation estimate buffer 340. The gain compensation estimation module 342 calculates the square root of the ratio of variance(Q) to variance(I) to obtain a current gain compensation estimate β(CURRENT). The gain compensation estimation module 342 also adds β(CURRENT) to β(PREV) to obtain a cumulative gain compensation estimate β(CUMULATIVE). β(CUMULATIVE) or its reciprocal is presented at output 350 to be used as a factoring coefficient by the multipliers 118 and 119 of FIG. 1, subject to additional criteria described below. β(CUMULATIVE) is also stored in the previous gain compensation estimate buffer 340 as a new β(PREV) for use in the next iteration.

The gain compensation module 140 also includes a clipping threshold estimation module 344 communicatively coupled to the variance power module 328. The clipping threshold estimation module 344 calculates a clipping logic threshold value proportional to a product of β(CUMULATIVE) and an ADC full-scale value. The ADC full-scale value is stored in a buffer 346 communicatively coupled to the clipping threshold estimation module 344. The resulting clipping logic threshold value is sent to the clipping logic modules 130 and 133 of FIG. 1 on output 354 to balance clipping levels in the I and Q arms at each iteration during gain compensation convergence.

The gain compensation module 140 further includes an iteration control module 360 communicatively coupled to the sample buffer logic module 315 and to the gain compensation estimation module 342. The iteration control module 360 controls successive iterations of compensated data sampling, gain compensation estimation, and clipping threshold estimation. A buffer 362 is communicatively coupled to the iteration control module 362 store a number of iterations of P as specified by design criteria to achieve a desired level of convergence of the gain compensation coefficient β(CUMULATIVE).

FIG. 4 is a block diagram of a clipping logic module 400 in a gain and phase compensation network according to various example embodiments. The clipping logic module 400 includes clipping level logic 405 to calculate a clipping level. The clipping level logic 405 receives the cumulative gain compensation estimate β(CUMULATIVE) at an input 415 and a value 420 representing maximum ADC signal range at an input 422. Both values are received from the gain compensation module 140. The clipping level is calculated as the absolute value of the largest digital value capable of representation by the applicable ADC factored by β(CUMULATIVE). For example, assume a six-bit ADC capable of a maximum value of $|(2^6)/2|=32$. If β(CUMULATIVE) were equal to 0.75, the clipping level logic 405 would, in this example, calculate the clipping level as 32*0.75=24.

The clipping logic module 400 also includes a comparator 425 communicatively coupled to the clipping level logic 405. The comparator 425 receives a gain compensated sample value I(GC) or Q(GC) and compares the sample value to the clipping level. The clipping logic module 400 further includes a clipper 430 coupled to the comparator 425. The clipper 430 factors the magnitude of the gain compensated sample value down to the clipping level if the gain compensated sample value exceeds the clipping level. A gain and clipping level compensated output value I(GCC) or Q(GCC) appears at the output 440 of the clipping logic module 400.

FIG. 5 is a block diagram of a phase compensation module 150 in a gain and phase compensation network according to various example embodiments. The phase compensation module 150 operates on clipping-corrected data. That is, I-arm and Q-arm signal distributions are normalized with respect to each other as received at the phase compensation portion of the network 100. Phase compensation is more accurate as a result.

The phase compensation module 150 includes a compensated data sampling and power calculation module 505. The compensated data sampling and power calculation module 505 includes I and Q sample buffers 510 and 512, a sample buffer logic module 515, total power and DC power modules 520 and 524, and a variance power module 528. The included modules operate as previously described with reference to the gain compensation module 140 to obtain a variance(I) of average AC signal power in the I arm and a variance(Q) of average AC signal power in the Q arm. It is noted, however, that the modules 510, 512, 515, 520, 524 operate on data samples from the I(C) and Q(C) outputs 170 and 172 of the gain, clipping, and phase compensation network 100 of FIG. 1.

The phase compensation module 150 also includes a standard deviation module 530 communicatively coupled to the compensated data sampling and power calculation module 505. The standard deviation module 530 calculates a standard deviation of Iσ(I) as a square root of the variance(I) and a standard deviation of Qσ(Q) as a square root of the variance (Q).

The phase compensation module 150 further includes an I-dot-Q expectation module 540 communicatively coupled to the compensated data sampling and power calculation module 505. The I-dot-Q expectation module 540 calculates a mathematical expectation E[I·Q] of the dot product of the I data samples and the Q data samples.

The phase compensation module 150 also includes I and Q expectation modules 544 and 548 communicatively coupled to the compensated data sampling and power calculation module 505. The I and Q expectation modules 544 and 548 calculate mathematical expectations E[I] and E[Q] of the I and Q data samples, respectively.

The phase compensation module 150 also includes a biased phase estimation module 550 communicatively coupled to the I-dot-Q expectation module 540 and to the standard deviation module 530. The biased phase estimation module 550 calculates a DC-biased phase angle compensation estimate Φ(CURRENT_BIASED) equal to arcsine $\{E[I \cdot Q]/\sigma(I)*\sigma(Q)\}$.

A DC phase estimation module 552 is communicatively coupled to the I expectation module 544, the Q expectation module 548, and the standard deviation module 530. The DC phase estimation module 552 calculates a DC component Φ(DC) of the DC-biased phase angle compensation estimate Φ(CURRENT_BIASED). The DC component Φ(DC) is equal to an arcsine of a dot product of the expectation E[I] and the expectation E[Q] divided by $\sigma(I)*\sigma(Q)$.

The phase compensation module 150 also includes a phase angle determination module 555 communicatively coupled to the biased phase estimation module 550 and to the DC phase estimation module 552. The phase angle determination module 555 subtracts Φ(DC) from Φ(CURRENT_BIASED) to obtain a current unbiased phase correction angle Φ(CURRENT_UNBIASED). The phase angle determination module 555 also adds Φ(CURRENT_UNBIASED) to a cumulative phase estimate Φ(PREV) accrued from previous iterations to obtain Φ(CUMULATIVE). Φ(CUMULATIVE) is made available to the phase compensation network on output 556. A previous phase angle estimation module 558 stores the cumulative previously calculated phase estimate Φ(PREV) between iterations.

The phase compensation module 150 further includes an iteration control module 560 communicatively coupled to the compensated data sampling and power calculation module and to the phase angle determination module 555. The iteration control module 560 controls successive iterations of compensated data sampling and phase angle compensation estimation. A buffer 562 stores a desired number of iterations, R. It is noted, however, that some embodiments may determine the phase compensation angle in a single iteration, as previously described.

FIG. 6 is a detailed flow diagram representing a method 600 of performing gain and phase compensation in an RF quadrature receiver according to various example sequences. The method 600 includes performing a first set of iterations to determine an estimated gain compensation coefficient associated with a gain compensation function in a receiver I arm, Q arm, or both. The method 600 also includes determining a clipping threshold associated with a clipping compensation function in the I arm, the Q arm, or both.

Each iteration operates on a gain and clipping compensated set of I data samples and Q data samples. The samples are captured at the I and Q data outputs of a gain and clipping compensation network associated with the receiver (e.g., the outputs 144 and 148 of FIG. 1) following frequency conversion and ADC conversion. The samples are buffered for processing during a sampling period at the start of each iteration.

The method 600 also includes factoring a set of received I data samples and received Q data samples using the gain compensation function. A current gain compensated set of I data and Q data samples results. The method 600 further includes performing clipping operations on the current gain compensated set of I data samples and Q data samples using the clipping compensation function. A current gain and clipping compensated set of I data samples and Q data samples results. The latter samples are used as input data to a next one of the first set of iterations. One skilled in the art will note that this portion of the method 600 is recursive with regard to sample data sets following the first set captured and processed.

Following completion of the first set of iterations, the method 600 proceeds with determining a phase correction angle Φ and coefficients associated with a phase compensation function in the Q-arm of the quadrature receiver channel. The phase correction angle Φ is determined from one or more gain and clipping compensated sets of I data samples and one or more sets of gain, clipping, and phase compensated Q data samples. The method 600 also includes using the phase compensation function in the Q-arm to factor one or more gain and clipping compensated Q data samples. A corresponding number of Q data samples compensated for gain and phase mismatch in the presence of ADC clipping result.

Figure 6A:
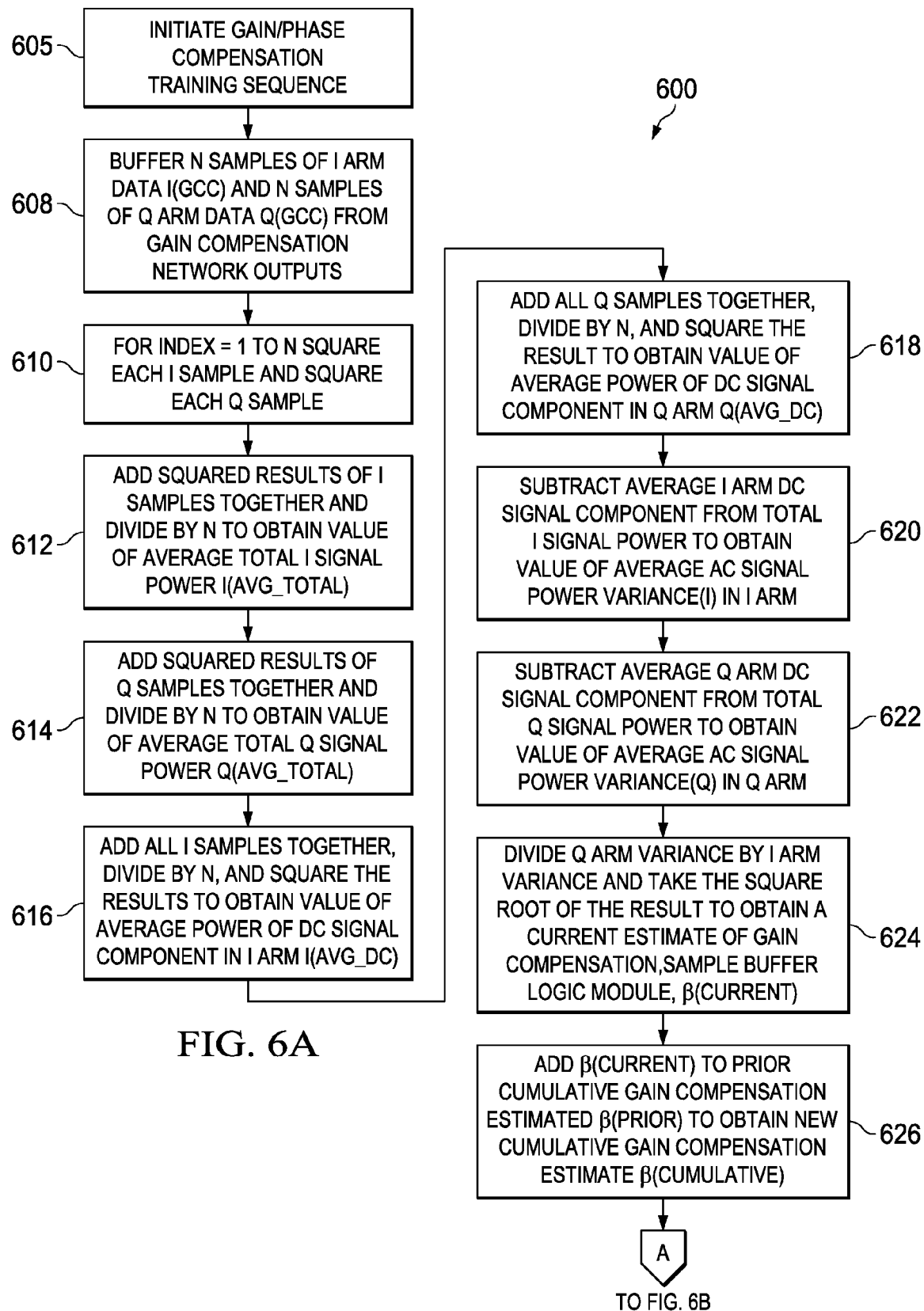
FIG. 6 is a detailed flow diagram representing a method of performing gain and phase compensation in an RF quadrature receiver according to various example sequences.
Figure 6B:
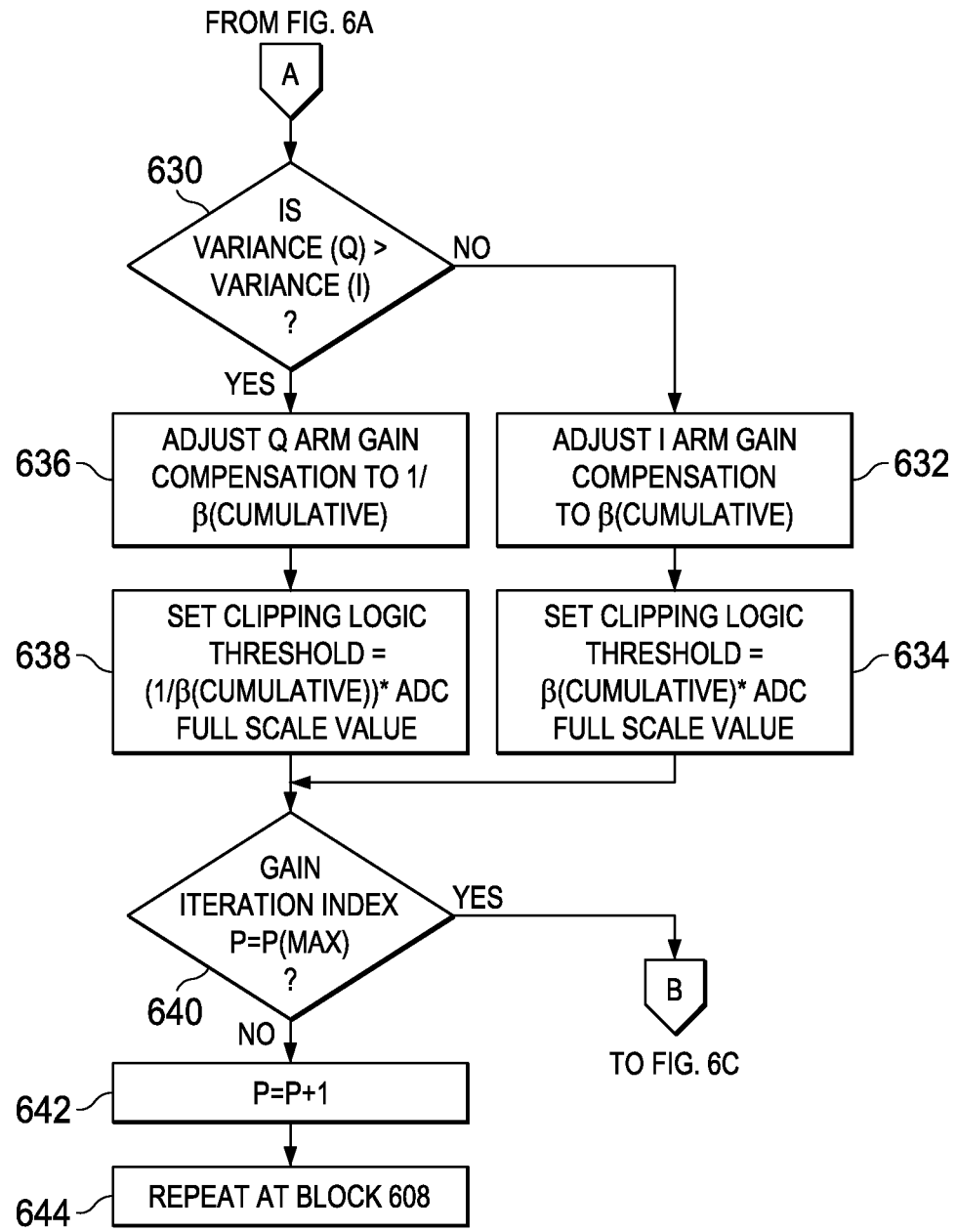
Figure 6C:
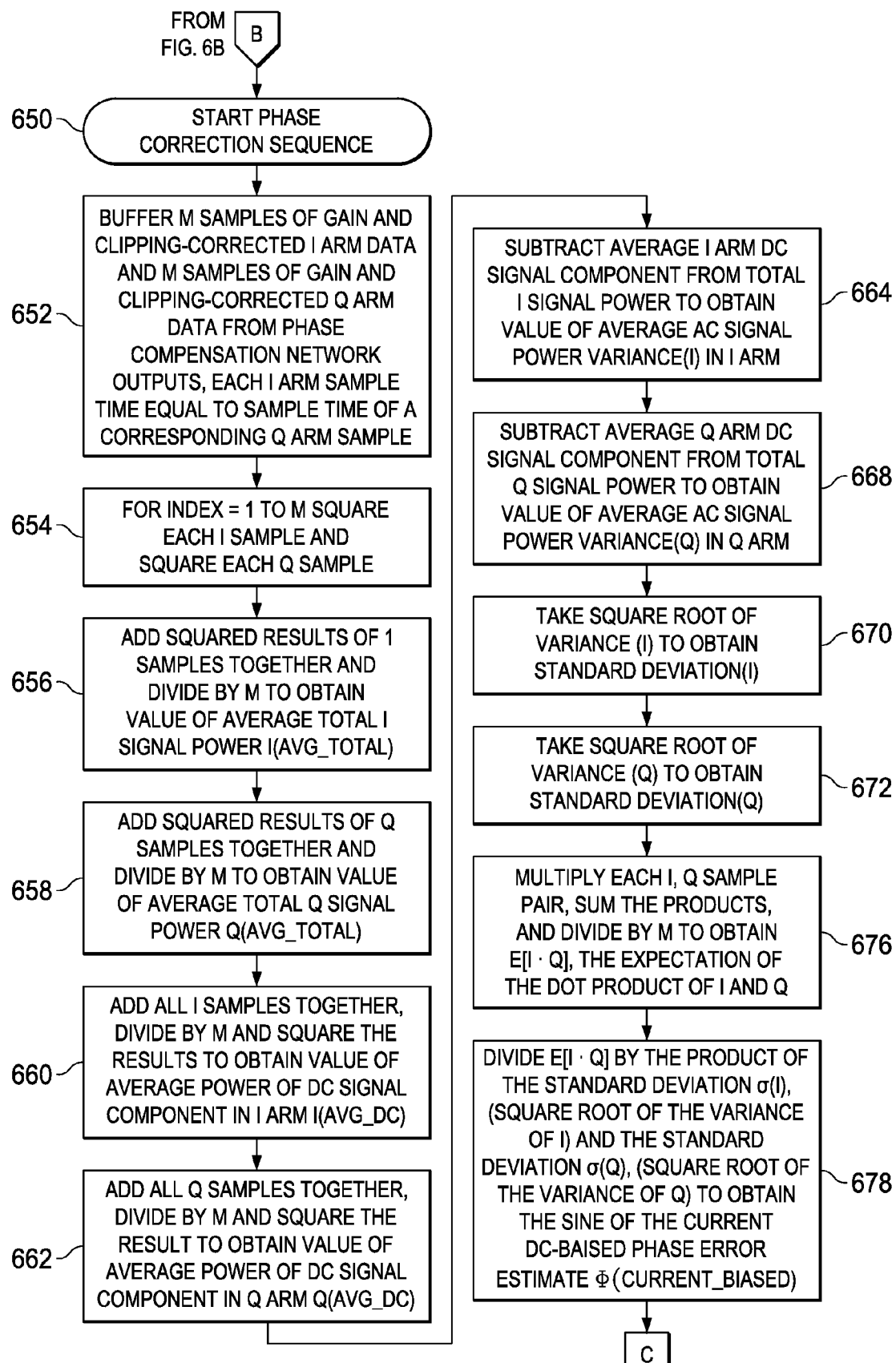
Figure 6D:
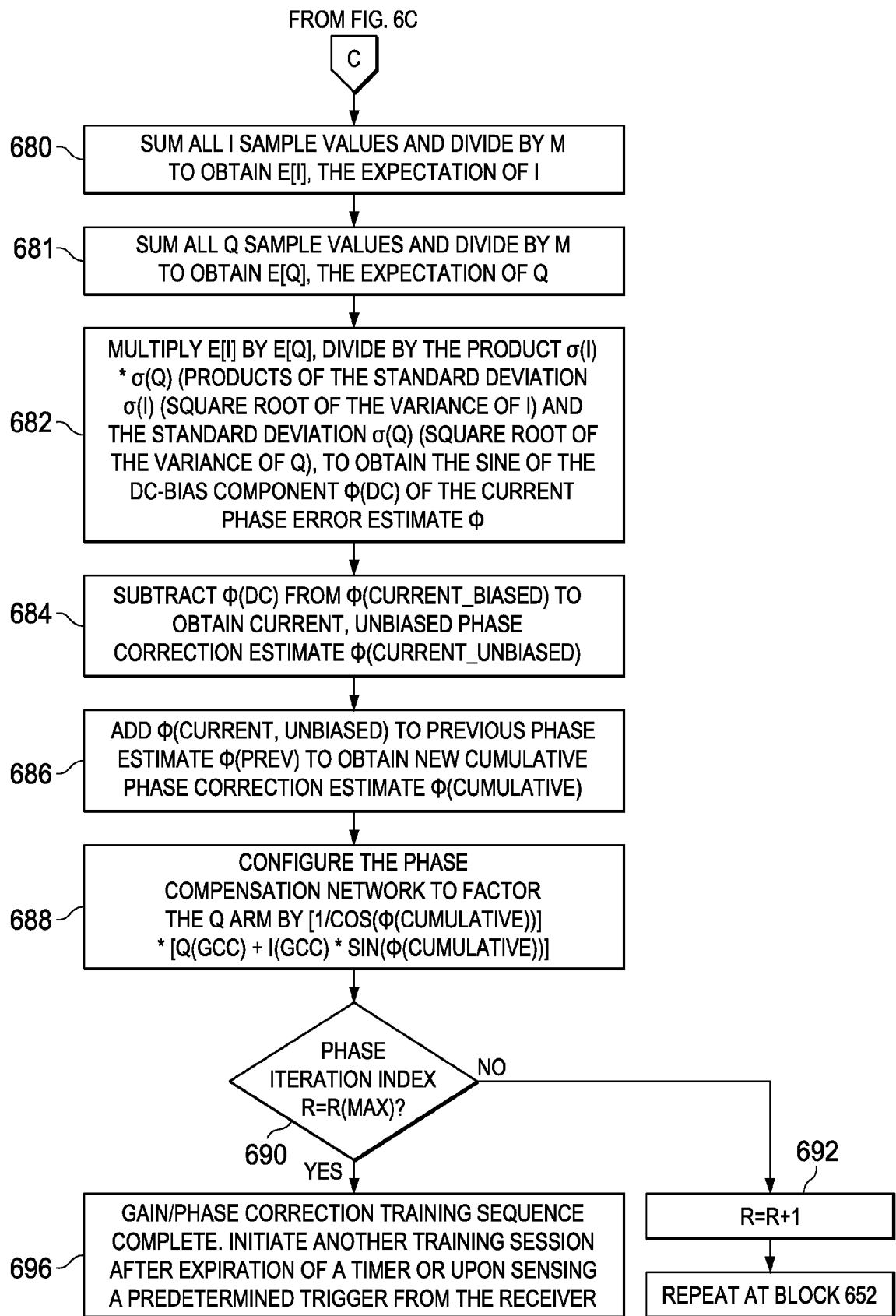

Referring to FIG. 6A, the method 600 commences at block 605 with initiating a gain and phase compensation training sequence. The method 600 continues at block 608 with buffering N samples of I-arm data I(GCC) and N samples of Q-arm data Q(GCC) as received at gain compensation network outputs (e.g. the outputs 144 and 148 of FIG. 1). The method 600 includes mathematically squaring each I sample and each Q sample individually, at block 610. The method 600 also includes adding the squared I samples together and dividing by N to obtain a value I(AVG_TOTAL) of average total signal power in the I arm during the sampling period, at block 612. The method 600 further includes adding the squared Q samples together and dividing by N to calculate a value Q(AVG_TOTAL) of average total signal power in the Q arm during the sampling period, at block 614.

The method 600 continues at block 616 with adding all non-squared I samples together, dividing by N, and squaring to obtain a value I(AVG_DC) of average power of a DC signal component in the I arm during the sampling period. The method 600 also includes adding all non-squared Q samples together, dividing by N, and squaring to obtain a value Q(AVG_DC) of average power of a DC signal component in the Q arm during the sampling period, at block 618.

The method 600 includes subtracting I(AVG_DC) from I(AVG_TOTAL) to obtain a variance(I) representing an average AC signal power in the I arm, at block 620. The method 600 further includes subtracting Q(AVG_DC) from Q(AVG_TOTAL) to obtain a variance(Q) representing an average AC signal in the Q arm, at block 622.

The method 600 proceeds at block 624 with dividing the variance(Q) by the variance(I) to obtain a ratio of variances and finding a square root of the ratio of variances to obtain a current estimate β(CURRENT) of a gain compensation coefficient R.

The method 600 also includes adding a prior cumulative total β(PRIOR) of previously-calculated gain compensation estimates to β(CURRENT) to obtain a new cumulative gain compensation estimate β(CUMULATIVE), at block 626.

The method 600 continues at block 630 with determining whether previously-calculated variance(Q) is greater than variance(I). If not, the method 600 includes adjusting I-arm gain compensation to β(cumulative), at block 632. In this case the method 600 also includes setting a clipping logic threshold value. The clipping threshold value is set equal to a product of β(cumulative) and a full-scale value associated with ADCs used to convert the I and Q signals, at block 634.

If previously-calculated variance(Q) is greater than variance(I), the method 600 includes adjusting the Q arm gain compensation to 1/β(cumulative), at block 636. The method 600 also, in this case, includes setting the clipping logic threshold value equal to a product of 1/β(cumulative) and the ADC full-scale value, at block 638.

The method 600 continues at block 640 with determining whether a predetermined number P of gain compensation iterations have occurred. If P iterations have not occurred, the method 600 includes incrementing a gain iteration counter by one, at block 642, and initiating another iteration, at block 644. The method 600 repeats at block 608 with buffering a new set of N samples of I arm data I(GCC) and N samples of Q arm data Q(GCC) from gain compensation network outputs and determining updated values for β(cumulative) and clipping logic coefficients.

If the predetermined number of gain compensation iterations P has occurred, the method 600 continues at block 650 with starting a phase correction sequence. The phase correction sequence commences at block 652 with buffering M samples of gain, clipping, and phase-compensated I-arm data and M samples of gain, clipping, and phase-compensated Q-arm data (e.g., as received at phase compensation network outputs I(C) and Q(C) of FIG. 1);

The method 600 proceeds with mathematically squaring each I sample and each Q sample, at block 654. The method 600 also includes adding the squared results of all I data samples and dividing by M to obtain a value I(AVG_TOT) of average total I-arm signal power in I-arm data, at block 656. The method 600 further includes adding the squared results of all Q data samples and dividing by M to obtain a value Q(AVG_TOTAL) of average total Q-arm signal power in Q-arm data, at block 658.

The method 600 also includes adding all I samples together, dividing the resulting sum by M, and squaring the quotient to obtain a value I(AVG_DC) of average power of a DC signal component in the I arm, at block 660. Likewise the method 600 includes adding all Q samples together, dividing the resulting sum by M, and squaring the quotient to obtain a value Q(AVG_DC) of average power of a DC signal component in the Q arm, at block 662.

The method 600 continues at block 664 with subtracting the average I arm DC signal component I(AVG_DC) from total I signal power I(AVG_TOTAL) to obtain a variance(I) corresponding to average AC signal power in the I arm. Likewise, the method 600 includes subtracting the average Q arm DC signal component Q(AVG_DC) from total Q signal power Q(AVG_TOTAL) to obtain a variance(Q) corresponding to average AC signal power in the Q arm, at block 668.

The method 600 also includes determining a square root of the variance(I) to obtain a standard deviation of I, σ(I), at block 670. Likewise the method 600 includes determining a square root of the variance(Q) to obtain a standard deviation of Qσ(Q), at block 672.

The method 600 includes multiplying each I, Q sample pair, summing the resulting products, and dividing by M to obtain E[I·Q], an expectation of a dot product of I and Q, at block 676. The method 600 also includes dividing E[I·Q] by a product of σ(I) and σ(Q) to obtain the trigonometric sine of a current DC-biased phase error estimate Φ(CURRENT_BIASED), at block 678.

The method 600 also includes summing all I sample values and dividing the result by M to obtain E[I], an expectation of I, at block 680. The Q samples are also summed and divided by M to obtain E[Q], an expectation of Q, at block 681.

The method 600 continues at block 682 with multiplying E[I] by E[Q] and dividing the result by the product of σ(I) and σ(Q) to obtain the sine of a DC bias component Φ(DC) of Φ(CURRENT_BIASED).

The method 600 includes subtracting Φ(DC) from Φ(CURRENT_BIASED) to obtain a current, unbiased phase correction estimate Φ(CURRENT_UNBIASED), at block 684.

The method 600 further includes adding Φ(CURRENT_UNBIASED) to a previous phase estimate Φ(PREV) to obtain a new cumulative phase correction estimate Φ(CUMULATIVE), at block 686.

The method 600 also includes configuring the phase compensation network to factor the Q arm by [1/COS(Φ(CUMULATIVE))]*[Q(GCC+I(GCC)*SIN(Φ(CUMULATIVE))] at block 688.

The method 600 continues with comparing the phase iteration index R to a maximum iteration index, R(MAX), at block 690. If the maximum number of iterations has not occurred, the method 600 includes incrementing the index R, at block 692, and initiating an additional phase angle correction iteration, at block 694. It is noted that R(MAX) may be set equal to 1 in some example sequences in order to implement a single-iteration phase angle correction estimate and associated coefficients.

If R=R(MAX), the method 600 includes awaiting another gain/phase correction training sequence opportunity as triggered by an expiration of a timeout period or other selected trigger parameter(s), at block 696.

Modules and components described herein may include hardware circuitry, optical components, single or multi-processor circuits, memory circuits and/or computer-readable media with computer instructions encoded therein/thereon capable of being executed by a processor, including non-volatile memory with firmware stored therein, but excluding non-functional descriptive matter, and combinations thereof, as desired by the architects of the apparatus 100, 140, 150, and 400 and the methods 200 and 600 and as appropriate for particular implementations of various embodiments.

Apparatus and methods described herein may be useful in applications other than determining gain, clipping, and phase training coefficients and applying them in an RF quadrature receiver. Other applications may exist for the described methods and apparatus. Examples of the apparatus 100, 140, 150, and 400 and the methods 200 and 600 are intended to provide a general understanding of the flow of various sequences and the structures of various embodiments. They are not intended to serve as complete descriptions of all elements and features of apparatus and systems that might make use of these sequences and structures.

The various embodiments may be incorporated into electronic circuitry used in lighting control systems, computers, communication and signal processing circuitry, single-processor or multi-processor modules, single or multiple embedded processors, multi-core processors, data switches, and application-specific modules including multi-layer, multi-chip modules, among others. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others.

Apparatus and methods described herein perform quadrature RF receiver gain, clipping, and phase compensation in the presence of I/Q mismatch exacerbated by differential clipping in low resolution I and Q ADCs. Improved image rejection performance may result.

By way of illustration and not of limitation, the accompanying figures show specific embodiments in which the subject matter may be practiced. It is noted that arrows at one or both ends of connecting lines are intended to show the general direction of electrical current flow, data flow, logic flow, etc. Connector line arrows are not intended to limit such flows to a particular direction such as to preclude any flow in an opposite direction. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense. The breadth of various embodiments is defined by the appended claims and the full range of equivalents to which such claims are entitled.

Such embodiments of the inventive subject matter may be referred to herein individually or collectively by the term "invention" merely for convenience and without intending to voluntarily limit this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the preceding Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. The following claims are hereby incorporated into the Detailed Description, with each claim standing on its own as a separate embodiment.

What is claimed is:

1. A quadrature signal processing method comprising:
   determining a clipping threshold and a gain correction value associated with data samples in an in-phase (I) arm and a quadrature (Q) arm in a channel of a quadrature receiver following frequency conversion and analog-to-digital (ADC) conversion;
   applying the gain correction value and clipping threshold to received and converted data in the I arm and the Q arm such as to balance a statistical distribution between data in the I arm and data in the Q arm and to enable correction of gain and phase imbalance in the I and Q arms;
   the determining a clipping threshold and a gain correction value including:
   during a first set of iterations, determining, from a gain and clipping compensated set of I data samples and Q data samples captured during a sampling period at a start of each iteration, an estimated gain compensation coefficient associated with a gain compensation function in the I arm and the Q arm and an updated clipping threshold associated with a clipping compensation function in the I arm and the Q arm of the quadrature receiver channel following frequency conversion and analog-to-digital (ADC) conversion;
   factoring a set of received I data samples and Q data samples using the gain compensation function to obtain a current gain compensated set of I data and Q data samples; and
   performing clipping operations on the current gain compensated set of I data samples and Q data samples using the updated clipping threshold outputted from the clipping compensation function to obtain a current gain and clipping compensated set of I data samples and Q data samples to use as input data to a next one of the first set of iterations.

2. The quadrature signal processing method of claim 1, including:
   following completion of the first set of iterations, determining, from at least one gain and clipping compensated set of I data samples and at least one gain, clipping, and phase compensated set of Q data samples, a phase correction angle $\Phi$ and coefficients associated with a phase compensation function in the Q-arm of the quadrature receiver channel; and
   factoring at least one gain and clipping compensated Q data sample using the phase compensation function in the Q-arm to obtain a Q data sample compensated for gain and phase mismatch in the presence of ADC clipping.

3. The quadrature signal processing method of claim 1, including:
   buffering a number of samples (N) of gain and clipping compensated I-arm data I(GCC) and a number of samples (N) of gain and clipping compensated Q-arm data Q(GCC) as received at gain compensation network outputs;
   mathematically squaring each I sample and each Q sample;
   adding squared I samples together and dividing by N to obtain a value I(AVG_TOTAL) of average total signal power in the I arm during the sampling period;
   adding squared Q samples together and dividing by N to calculate a value Q(AVG_TOTAL) of average total signal power in the Q arm during the sampling period;
   adding all non-squared I samples together, dividing by N, and squaring to obtain a value I(AVG_DC) of average power of a direct current (DC) signal component in the I arm during the sampling period;
   adding all non-squared Q samples together, dividing by N, and squaring to obtain a value Q(AVG_DC) of average power of a DC signal component in the Q arm during the sampling period;
   subtracting I(AVG_DC) from I(AVG_TOTAL) to obtain a variance(I) representing an average alternating current (AC) signal power in the I arm; and
   subtracting Q(AVG_DC) from Q(AVG_TOTAL) to obtain a variance(Q) representing an average AC signal in the Q arm.

4. The quadrature signal processing method of claim 3, including:
   dividing the variance(Q) by the variance(I) to obtain a ratio of variances;
   finding a square root of the ratio of variances to obtain a current estimate $\beta$(current) of a gain compensation coefficient $\beta$; and
   adding a prior cumulative total $\beta$(prior) of previously-calculated gain compensation estimates to at least one of $\beta$(current) or a function of $\beta$(current) to obtain a new cumulative gain compensation estimate $\beta$(cumulative).

5. The quadrature signal processing method of claim 4, including:
   adjusting I-arm gain compensation to $\beta$(cumulative) if the variance(Q) is less than the variance(I);

setting a clipping logic threshold value equal to a product of β(cumulative) and a full scale value associated with analog-to-digital converters (ADCs) used to convert the I and Q signals if the variance(Q) is less than the variance (I);

adjusting the Q arm gain compensation to 1/β(cumulative) if the variance(Q) is greater than or equal to the variance (I); and setting the clipping logic threshold value equal to a product of 1/β(cumulative) and the ADC full-scale value if the variance (Q) is greater than or equal to the variance(I).

6. The quadrature signal processing method of claim 5, including:

determining whether a predetermined number of gain compensation iterations have occurred;

if the predetermined number of gain compensation iterations has not occurred, incrementing a gain iteration counter by one;

buffering a new set of N samples of I arm data I(GCC) and N samples of Q arm data Q(GCC) from gain compensation network outputs;

determining updated values for β(cumulative) and clipping logic coefficients; and if a predetermined number of gain compensation iterations have occurred, continuing with a phase correction sequence.

7. The quadrature signal processing method of claim 1, including:

buffering a number of samples M of gain-compensated, clipping-corrected, and phase-compensated I-arm data and the same number M of samples of gain-compensated, clipping-corrected, and phase-compensated Q-arm data as received at phase compensation network outputs I(C) and Q(C);

mathematically squaring each I sample, summing the squares, and dividing by M to obtain a value I(AVG_TOTAL) of average total I-arm signal power in I-arm data; and mathematically squaring each Q sample, summing the squares, and dividing by M to obtain a value Q(AVG_TOTAL) of average total Q-arm signal power in Q-arm data.

8. The quadrature signal processing method of claim 7, including:

adding all I samples together, dividing by M, and squaring to obtain a value I(AVG_DC) of average power of a direct current (DC) signal component in the I arm;

adding all Q samples together, dividing by M, and squaring to obtain a value I(AVG_DC) of average power of a DC signal component in the Q arm;

Subtracting the average I arm DC signal component I(AVG_DC) from total I signal power I(AVG_TOTAL) to obtain a variance(I) corresponding to an average alternating current (AC) signal power in the I arm;

determining a square root of the variance(I) to obtain a standard deviation of I, $\sigma(I)$;

Subtracting the average Q arm DC signal component Q(AVG_DC) from total Q signal power Q(AVG_TOTAL) to obtain a variance(Q) corresponding to average AC signal power in the Q arm; and determining a square root of the variance(Q) to obtain a standard deviation of Q, $\sigma(Q)$.

9. The quadrature signal processing method of claim 8, including:

multiplying each I, Q sample pair, summing resulting products, and dividing by M to obtain E[I·Q], an expectation of a dot product of I and Q; and dividing E[I·Q] by a product of $\sigma(I)$ and $\sigma(Q)$ to obtain a trigonometric sine of a DC− biased current phase error estimate Φ(CURRENT_BIASED).

10. The quadrature signal processing method of claim 9, including:

summing all I sample values and dividing by M to obtain E[I], an expectation of I; summing all Q sample values and dividing by M to obtain E[Q], an expectation of Q; and multiplying E[I] by E[Q] and dividing the result by a product of $\sigma(I)$ and $\sigma(Q)$ to obtain a sin of a DC bias component Φ(DC) of Φ(CURRENT_BIASED).

11. The quadrature signal processing method of claim 10, including:

subtracting Φ(DC) from Φ(CURRENT_BIASED) to obtain a current, unbiased phase correction estimate Φ(CURRENT_UNBIASED); and adding Φ(CURRENT_UNBIASED) to a previous phase estimate Φ(PREV) to obtain a new cumulative phase correction estimate Φ(CUMULATIVE).

12. The quadrature signal processing method of claim 11, including:

configuring the phase compensation network to factor the Q arm by a phase compensation factor [1/COS(Φ(CUMULATIVE))]*[Q(GCC)−I(GCC)*SIN(Φ(CUMULATIVE))];

comparing the phase iteration index R to R(MAX);

incrementing R if R is less than R(MAX) and performing an additional phase compensation iteration operation; and awaiting another gain/phase correction training sequence opportunity as triggered by an expiration of a timeout period or other selected receiver trigger parameter(s) if R=R(MAX).

* * * * *